US012691934B2

(12) United States Patent
Suplin et al.

(10) Patent No.: US 12,691,934 B2
(45) Date of Patent: Jul. 28, 2026

(54) VEHICLE CONTROL USING MULTIPLE ACTUATORS

(71) Applicant: GM Global Technology Operations LLC, Detroit, MI (US)

(72) Inventors: Vladimir Suplin, Modin (IL);
Avshalom Suissa, Ganei Tikva (IL);
Oded Yechiel, Rishon LeZion (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 87 days.

(21) Appl. No.: 18/638,048

(22) Filed: Apr. 17, 2024

(65) Prior Publication Data

US 2025/0326431 A1      Oct. 23, 2025

(51) Int. Cl.
B62D 6/00          (2006.01)
(52) U.S. Cl.
CPC ...................................... B62D 6/00 (2013.01)
(58) Field of Classification Search
CPC ....................................................... B62D 6/00
USPC ........................................................... 701/41
See application file for complete search history.

(56) References Cited

U.S. PATENT DOCUMENTS

2020/0317198 A1* 10/2020 Hashemi ............. B60W 40/068
2020/0341476 A1* 10/2020 Wuthishuwong ...... G08G 1/167
2025/0002080 A1* 1/2025 Gonschorek ............. B62D 6/04

FOREIGN PATENT DOCUMENTS

DE        4410429 A1    9/1994
DE    102015009241 A1    1/2017
DE    102017008303 A1 * 10/2018 ............. B62D 7/159

OTHER PUBLICATIONS

German Office Action for German Application No. 102024114206.
5; dated May 6, 2025; 4 pages.

* cited by examiner

*Primary Examiner* — Scott A Reinbold
(74) *Attorney, Agent, or Firm* — CANTOR COLBURN LLP

(57)          ABSTRACT

A vehicle includes a system performing a method for controlling a vehicle. A first steering device generates a first steering force on the vehicle, and a second steering device generates a second steering force at the vehicle. A lateral control module sends a first steering command to the first steering device. An estimation module estimates an external lateral force applied to the vehicle based on the first steering command, a second steering command applied to the second steering device, and a state of the vehicle. A compensation module determines an adjusted value of the second steering command for generating a lateral motion at the vehicle to attenuate the external lateral force and operates the second steering device of the vehicle based on the adjusted value of the second steering command to generate the second steering force at the vehicle that attenuates the external lateral force.

20 Claims, 5 Drawing Sheets

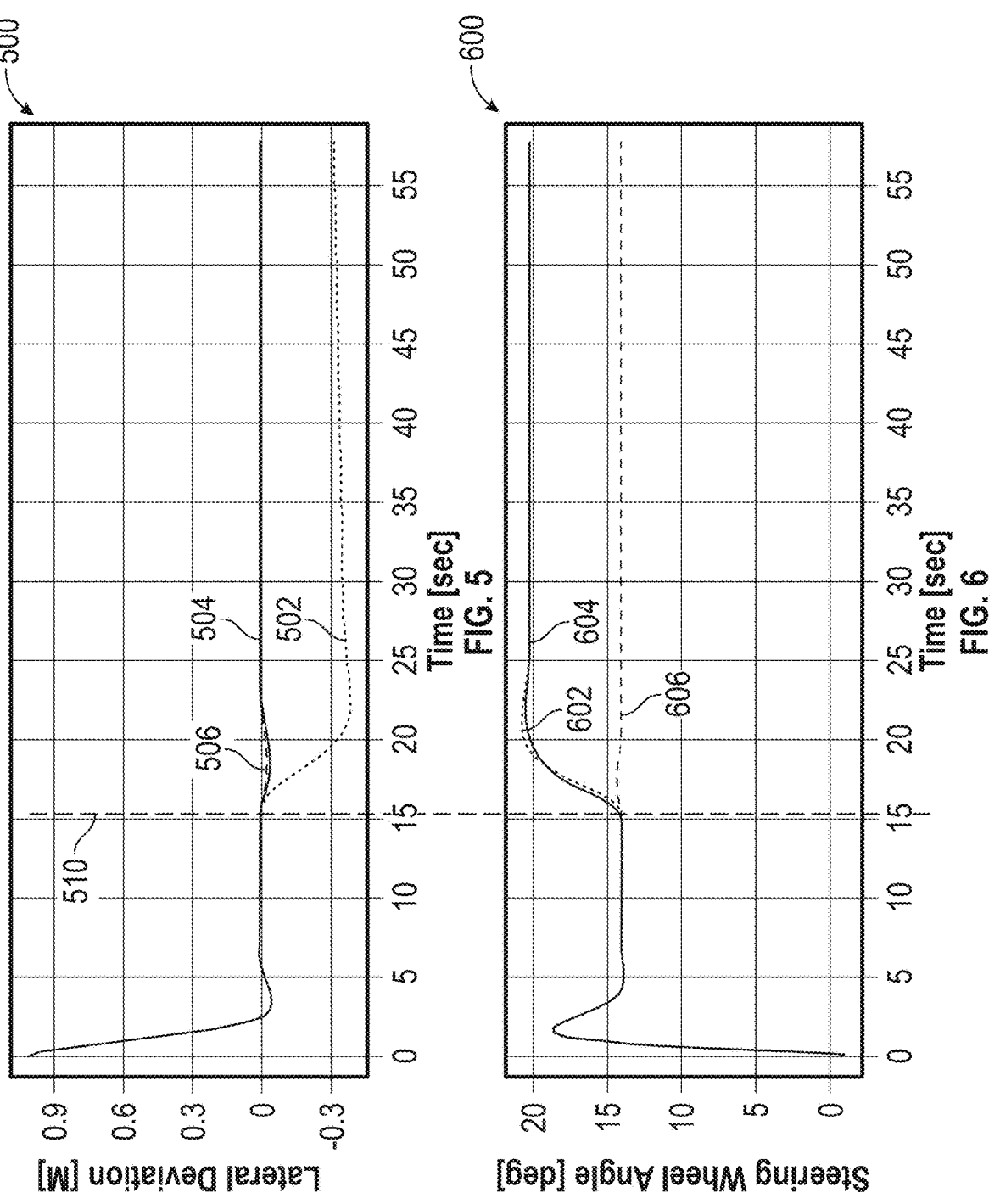

VEHICLE CONTROL USING MULTIPLE ACTUATORS

INTRODUCTION

The subject disclosure relates to lateral stability in autonomous or human-driven vehicles and, in particular, to a system and method for attenuating the effect of an externally applied lateral force on the vehicle.

In a vehicle, front wheel steering is used to change an orientation of the front wheels of the vehicle with respect to a longitudinal axis of the vehicle. In order to provide accurate tracking of a trajectory when a lateral disturbance is received, an autonomous vehicle can perform an action to quickly attenuate the disturbance. This, however, requires the steering wheel to move fast and sometimes erratically. On the other hand, in order to maintain passenger comfort, smoother steering wheel action is desired. Slower steering results in a slow attenuation of the disturbance. Accordingly, it is desirable to provide a system and method for attenuating a lateral disturbance to the vehicle while providing a comfortable ride to the passenger.

SUMMARY

In one exemplary embodiment, a method of controlling a vehicle is disclosed. A first steering device of the vehicle is operated based on a first steering command to generate a first steering force on the vehicle. A second steering device of the vehicle is operated based on a second steering command to generate a second steering force at the vehicle. A processor detects an external lateral force on the vehicle based on the first steering command, the second steering command, and a state of the vehicle, determines an adjusted value for the second steering command, wherein the adjusted value generates a lateral motion of the vehicle that attenuates the external lateral force, and operates the second steering device of the vehicle based on the adjusted value of the second steering command to generate a second steering force at the vehicle.

In addition to one or more of the features described herein, the first steering device is a front steering device of the vehicle for controlling steering at a front wheel of the vehicle.

In addition to one or more of the features described herein, the second steering device is at least one of a rear steering device for controlling steering at a rear wheel of the vehicle, a torque vector device for controlling steering of the vehicle, and an individual braking system for controlling steering of the vehicle.

In addition to one or more of the features described herein, the method further includes sending the first steering command from a lateral control module of the vehicle to the first steering device.

In addition to one or more of the features described herein, the method further includes determining the adjusted value of the second steering command at a compensation module of the vehicle and sending the adjusted value of the second steering command from the compensation module to the second steering device.

In addition to one or more of the features described herein, the method further includes determining a second steering reference at a compensation module of the vehicle and sending the second steering reference from the compensation module to the lateral control module, wherein the lateral control module generates the adjusted value of the second steering command from the second steering reference.

In addition to one or more of the features described herein, the method further includes determining the external lateral force using at least one of a filter, an Extended Kalman Filter, and a neural network.

In another exemplary embodiment, a system for controlling a vehicle is disclosed. The system includes a first steering device for generating a first steering force on the vehicle, a second steering device for generating a second steering force at the vehicle, and a processor. The processor is configured to operate a lateral control module to send a first steering command to the first steering device, operate an estimation module to estimate an external lateral force applied to the vehicle based on the first steering command, a second steering command, and a state of the vehicle, wherein the second steering command is applied to the second steering device, operate a compensation module to determine an adjusted value of the second steering command for generating a lateral motion at the vehicle to attenuate the external lateral force, and operate the second steering device of the vehicle based on the adjusted value of the second steering command to generate the second steering force at the vehicle that attenuates the external lateral force.

In addition to one or more of the features described herein, the first steering device is a front steering device of the vehicle for controlling steering at a front wheel of the vehicle.

In addition to one or more of the features described herein, the second steering device is at least one of a rear steering device for controlling steering at a rear wheel of the vehicle, a torque vector device for controlling steering of the vehicle, and an individual braking system for controlling steering of the vehicle.

In addition to one or more of the features described herein, the processor is further configured to operate the lateral control module to generate the first steering command using model predictive control using a steering request and the state of the vehicle.

In addition to one or more of the features described herein, the processor is further configured to operate the compensation module to generate the adjusted value of the second steering command and send the adjusted value of the second steering command to the second steering device.

In addition to one or more of the features described herein, the processor is further configured to operate the compensation module to determine a second steering reference and send the second steering reference to the lateral control module and to operate the lateral control module to generate the adjusted value of the second steering command from the second steering reference and send the adjusted value of the second steering command to the second steering device.

In addition to one or more of the features described herein, the processor is further configured to operate the estimation module to estimate the external lateral force using at least one of a filter, an Extended Kalman Filter, and a neural network.

In yet another exemplary embodiment, a vehicle is disclosed. The vehicle includes a front wheel, a first steering device for generating a first steering force at the front wheel, a second steering device for generating a second steering force at the vehicle, and a processor. The processor is configured to operate a lateral control module to send a first steering command to the first steering device, operate an estimation module to estimate an external lateral force applied to the vehicle based on the first steering command, a second steering command, and a state of the vehicle, wherein the second steering command is applied to the second steering device, operate a compensation module to determine an adjusted value of the second steering command for generating a lateral motion at the vehicle to attenuate the external lateral force, and operate the second steering device of the vehicle based on the adjusted value of the second steering command to generate the second steering force at the vehicle that attenuates the external lateral force.

In addition to one or more of the features described herein, the second steering device is at least one of a rear steering device for controlling steering at a rear wheel of the vehicle, a torque vector device for controlling steering of the vehicle, and an individual braking system for controlling steering of the vehicle.

In addition to one or more of the features described herein, the processor is further configured to operate the lateral control module to generate the first steering command using model predictive control using a steering request and the state of the vehicle.

In addition to one or more of the features described herein, the processor is further configured to operate the compensation module to generate the adjusted value of the second steering command and send the adjusted value of to the second steering command to the second steering device.

In addition to one or more of the features described herein, the processor is further configured to operate the compensation module to determine a second steering reference and send the second steering reference to the lateral control module and to operate the lateral control module to generate the adjusted value of the second steering command from the second steering reference and send the adjusted value of the second steering command to the second steering device.

In addition to one or more of the features described herein, the processor is further configured to operate the estimation module to estimate the external lateral force using at least one of a filter, an Extended Kalman Filter, and a neural network.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 5 shows a graph illustrating a lateral deviation of the vehicle in response to a disturbance; and FIG. 6 shows a graph illustrating a steering wheel angle of the vehicle in response to the disturbance.

DETAILED DESCRIPTION

Figure 1:
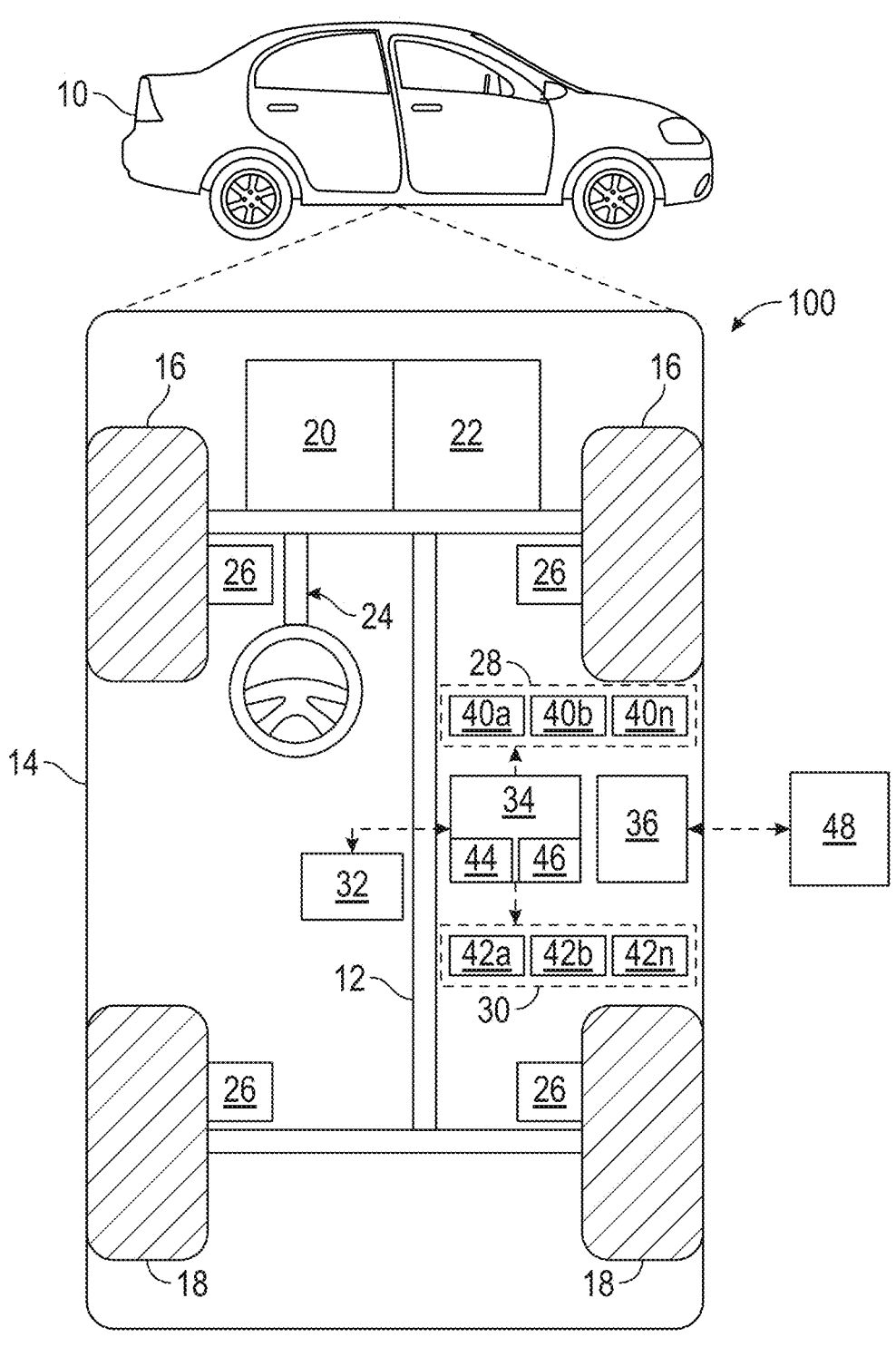
FIG. 1 shows a vehicle with an associated trajectory control system, in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows a vehicle 10 with an associated trajectory control system 100. In general, the trajectory control system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the trajectory control system 100 is incorporated into the autonomous vehicle. The autonomous vehicle is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the autonomous vehicle is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the front wheels 16 and rear wheels 18. The brake system 26 may, in various embodiments, include friction brakes, brake by wire, a regenerative braking system such as an electric machine, and/or other appropriate braking systems. The steering system 24 influences a position of at least one of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The sensor system 28 can also include dynamic sensors for measuring one or more dynamic parameters of the vehicle. Exemplary dynamic sensors include an inertial measurement unit (IMU) that measures accelerations at the vehicle in three dimensions, a steering angle sensor, a torque sensor, a yaw rate sensor, a wheel velocity sensor, etc. The dynamic sensors can provide a state of the vehicle, including pose (position and orientation) of the vehicle, vehicle speeds (along a longitudinal axis and along a lateral axis of the vehicle), vehicle accelerations (along a longitudinal axis and along a lateral axis of the vehicle), etc.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air conditioning, music, lighting, etc. (not shown).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a microprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the trajectory control system 100 and, when executed by the processor 44, performs a method of commanding an auxiliary steering device of the vehicle 10 to attenuate the effects of an externally applied lateral force on the vehicle such as from a gust of wind or other external force.

The communication system 36 is configured to wirelessly communicate information to and from other entities 48, such as but not limited to, other vehicles ("V2V" communication,) infrastructure ("V2I" communication), remote systems, Global Positioning Satellite (GPS), map servers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
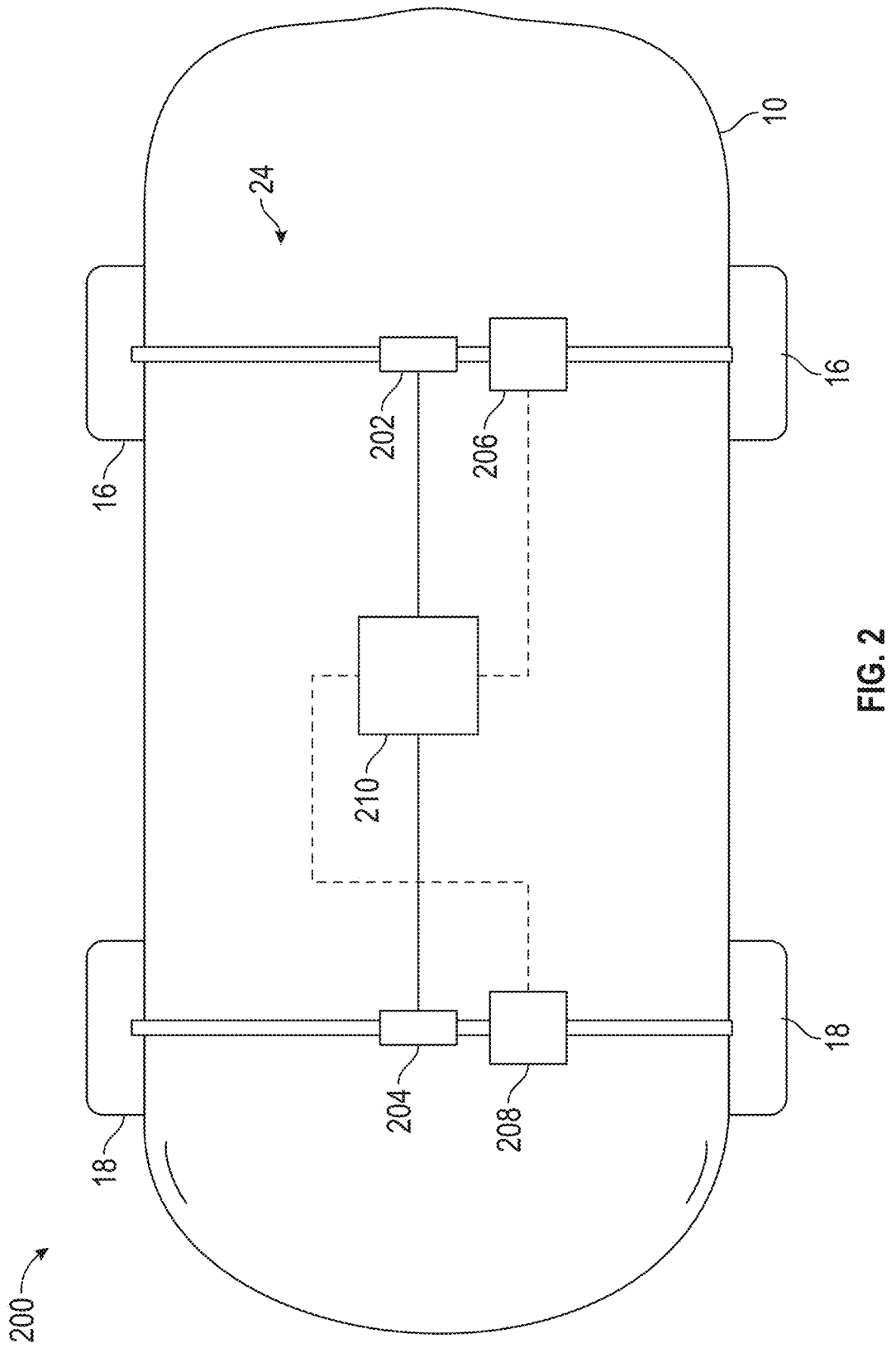
FIG. 2 is a diagram showing details of the steering system of the vehicle in an embodiment.

FIG. 2 is a diagram 200 showing details of the steering system 24 of the vehicle 10 in an embodiment. The steering system 24 includes a front steering device 202 for controlling a first steering angle of the front wheels 16 and a rear steering device 204 for controlling a second steering angle of the rear wheels 18. A front drive system 206 controls a torque applied to the front wheels 16. A rear drive system 208 controls a torque applied to the rear wheels 18. A control unit or processor 210 controls operation of the front steering device 202, the rear steering device 204, the front drive system 206 and the rear drive system 208.

The processor 210 can steer the vehicle by sending a front steering command to the front steering device 202 and/or a rear steering command to the rear steering device 204. The processor 210 can also steer the vehicle using torque vectoring by controlling the front drive system 206 and the rear drive system 208 to provide a suitable torque on the vehicle about a yaw axis of the vehicle.

Figure 3:
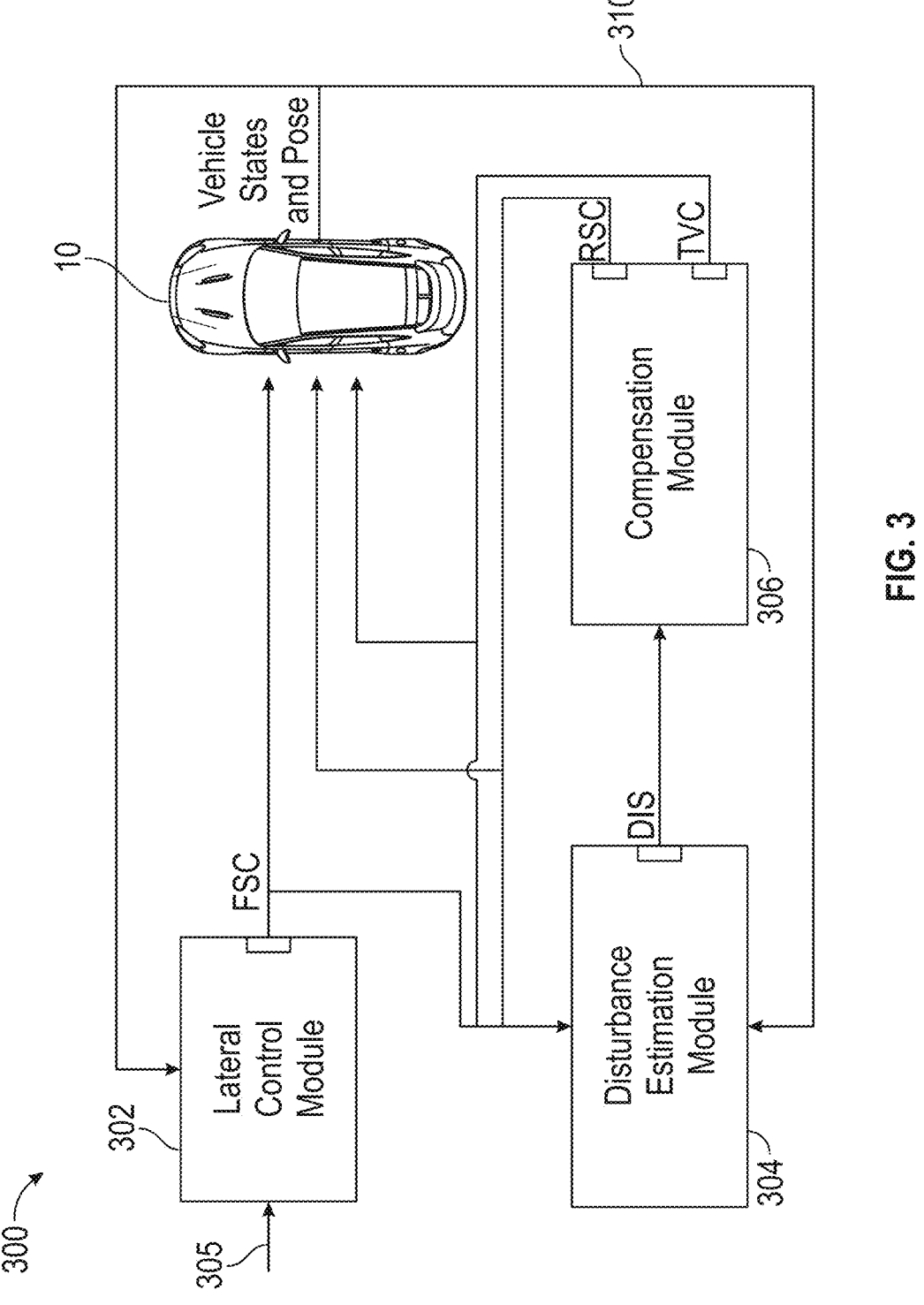
FIG. 3 is a diagram illustrating operation of the steering system of a vehicle to attenuate the effect of a lateral disturbance externally applied to the vehicle, in an embodiment.

FIG. 3 is a diagram 300 illustrating operation of the steering system 24 of a vehicle to attenuate the effect of a lateral disturbance externally applied to the vehicle, in an embodiment. The steering system 24 can be part of an autonomous driving system (as shown in FIG. 1), an advanced driver assistance system (ADAS), a cruise control system, etc. The vehicle can also be a human-driven vehicle. The diagram 300 includes various modules that can be performed at the processor 210 to control the vehicle 10. These modules include a lateral control module 302, a disturbance estimation module 304 and a disturbance compensation module 306.

The lateral control module 304 generates one or more steering commands that are provided to the vehicle 10 to steer the vehicle. In particular, the lateral control module 302 generates a front steering command FSC that is used to control operation of the front steering device 202. The lateral control module 302 can receive either a steering request 305 from either an autonomous driving system or from a driver and generate the front steering command based on this steering request. In various embodiments, the lateral control module 302 determines the front steering command FSC by performing model predictive control (MPC) with a current state 310 and/or a current pose of the vehicle 10 and the steering request as input. The MPC employs any suitable model, such as a bicycle model.

The disturbance estimation module 304 calculates a disturbance DIS (e.g., an externally applied lateral force) on the vehicle based on the commands sent to the vehicle for steering and from a current vehicle state 310 and/or current vehicle pose. The disturbance estimation module 304 can calculate the disturbance DIS using various methods, including an Extended Kalman Filter (EKF), a filter, a neural network, etc.

During operation of the vehicle 10, the disturbance estimation module 304 receives, as input, the front steering command FSC output from the lateral control module 302 and the rear steering command RSC and the torque vectoring command TVC output form the disturbance compensation module 306. These inputs and the state 310 of the vehicle are used to calculate a subsequent disturbance DIS at the vehicle 10 at a future timestep. In an embodiment, the disturbance can be determined from the front steering command, the rear steering command, and a state of the vehicle. The disturbance DIS can be a result of force on the vehicle 10, a lateral displacement of the vehicle from a desired trajectory, etc. The disturbance DIS is sent from the disturbance estimation module 304 to the disturbance compensation module 306.

The disturbance compensation module 306 calculates possible steering commands that can be used at the vehicle to attenuate the disturbance DIS. The steering commands can include a rear steering command RSC and/or a torque vectoring command TVC. The rear steering command RSC can be used at the rear steering device 204. The rear steering command RSC can be an adjustment from a first value currently being applied to the rear steering device 204 to a second value for subsequently being applied at the rear steering device. The adjustment (or adjusted value) is used to counter or attenuate the disturbance. The torque vectoring command can be used at the processor 210 to activate the front drive system 206 and rear drive system 208 to thereby apply an appropriate torque at the vehicle that counteracts the disturbance or attenuates the effects to the disturbance.

Figure 4:
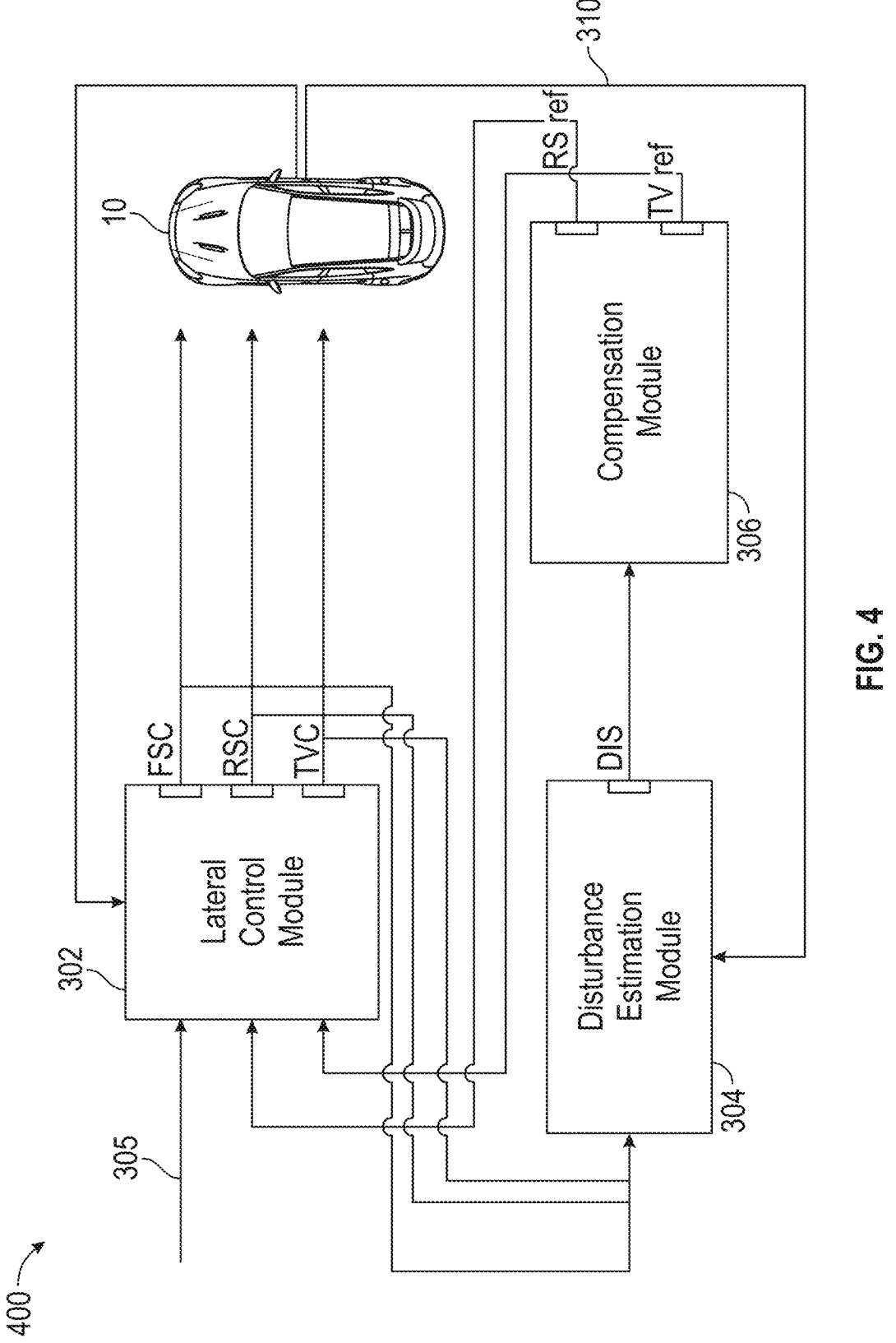
FIG. 4 is a diagram illustrating operation of the steering system of the vehicle to attenuate a lateral disturbance, in another embodiment.

FIG. 4 is a diagram 400 illustrating operation of the steering system of the vehicle 10 to attenuate a lateral disturbance, in another embodiment. The diagram 400 includes the lateral control module 302, the disturbance estimation module 304 and the disturbance compensation module 306.

The disturbance compensation module 306 generates a rear steering reference signal RSref and/or a torque vectoring reference signal TVref and sends these signals to the lateral control module 302. The lateral control module 302 uses these inputs in model predictive control (MPC) to calculate the front steering command FSC, the rear steering command RSC and/or the torque vectoring command TVC. The lateral control module 302 sends the front steering command FSC, the rear steering command RSC and/or the torque vectoring command TVC to the vehicle 10 for steering and attenuation of the lateral force.

The front steering command FSC, the rear steering reference signal RSref and the torque vectoring reference signal TVref are provided to the disturbance compensation module 304, which calculates a subsequent disturbance DIS at the vehicle 10 based on these inputs and the state 310 of the vehicle.

FIG. 5 shows a graph 500 illustrating a lateral deviation of the vehicle in response to a disturbance. Time is shown in seconds(s) along the abscissa and lateral deviation is shown in meters (m) along the ordinate axis. The control system is started at time=0 seconds with no external lateral force. Curve 502 shows the lateral movement of the vehicle with no compensation applied. Curve 504 shows the lateral movement with only front steering applied to attenuate the lateral movement. Curve 506 shows the lateral movement with front steering rear steering and torque vectoring applied. A lateral force is received at the vehicle 10 at about t=15 seconds, as indicated by line 510. Prior to receiving the lateral force, the lateral deviation reaches a steady state (at about t=3 seconds) at a nominal lateral deviation of 0 meters. Once the lateral force is received, curve 502 shows that the vehicle 10 experience a lateral deviation of about 30 centimeters within about 5 seconds after the application of the external force. Curve 504 and curve 506 show, respectively, that front steering and use of the methods disclosed herein are able to maintain the vehicle 10 at the nominal lateral deviation.

FIG. 6 shows a graph 600 illustrating a steering wheel angle of the vehicle in response to the disturbance. Time is shown in seconds(s) along the abscissa and steering wheel angle is shown in degrees (deg) along the ordinate axis. The steering wheel angle is at a steady state of around 15 degrees immediately prior to the application of the external force. Curve 602 shows the steering wheel angle with no compensation from the vehicle. The steering wheel angle increases from 15 degrees to about 20 degrees within about 5 seconds after the application of the external force. Curve 604 shows the steering wheel angle with only front steering applied. The steering wheel angle increases to about 20 degrees within about 5 seconds after the application of the external force. Curve 606 shows the steering wheel angle with front steering, rear steering and torque vectoring applied. The steering wheel angle remains at the steady state position (e.g., about 15 degrees).

While the methods disclosed herein includes one or more of the following actuators: rear steering, torque vectoring, and individual braking. These actuators can be used to control steering of the vehicle.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of controlling a vehicle, comprising:
   operating a first steering device of the vehicle based on a first steering command to generate a first steering force on the vehicle;
   operating a second steering device of the vehicle based on a second steering command to generate a second steering force at the vehicle;
   detecting, via a processor, an external lateral force on the vehicle based on the first steering command, the second steering command, and a state of the vehicle;
   determining, via the processor, a lateral deviation of the vehicle with respect to a nominal lateral deviation due to the external lateral force;
   determining a second steering reference at a compensation module of the vehicle;
   sending the second steering reference from the compensation module to a lateral control module;
   applying model predictive control to the second steering reference at the lateral control module to generate an adjusted value for the second steering command from the second steering reference, wherein the adjusted value generates a lateral motion of the vehicle that attenuates the external lateral force to maintain the vehicle at the nominal lateral deviation; and
   operating the second steering device of the vehicle based on the adjusted value of the second steering command to generate the second steering force at the vehicle.

2. The method of claim 1, wherein the first steering device is a front steering device of the vehicle for controlling steering at a front wheel of the vehicle.

3. The method of claim 2, wherein the second steering device is at least one of: (i) a rear steering device for controlling steering at a rear wheel of the vehicle; (ii) a torque vector device for controlling steering of the vehicle; and (iii) an individual braking system for controlling steering of the vehicle.

4. The method of claim 1, further comprising sending the first steering command from the lateral control module of the vehicle to the first steering device.

5. The method of claim 4, further comprising determining the adjusted value of the second steering command at the compensation module and sending the adjusted value of the second steering command from the compensation module to the second steering device.

6. The method of claim 1, further comprising determining the external lateral force using at least one of: (i) a filter; (ii) an Extended Kalman Filter; and (iii) a neural network.

7. A system for controlling a vehicle, comprising:
   a first steering device for generating a first steering force on the vehicle;

a second steering device for generating a second steering force at the vehicle;
   a processor configured to:
      operate a lateral control module to send a first steering command to the first steering device;
      operate an estimation module to estimate an external lateral force applied to the vehicle based on the first steering command, a second steering command, and a state of the vehicle, wherein the second steering command is applied to the second steering device, and to determine a lateral deviation of the vehicle with respect to a nominal lateral deviation due to the external lateral force;
      operate a compensation module to determine a second steering reference and send the second steering reference to the lateral control module;
      operate the lateral control module to apply model predictive control to the second steering reference to generate an adjusted value to the second steering command from the second steering reference and send the adjusted value to the second steering command to the second steering device; and
      operate the second steering device of the vehicle based on the adjusted value of the second steering command to generate the second steering force at the vehicle that attenuates the external lateral force to maintain the vehicle at the nominal lateral deviation.

8. The system of claim 7, wherein the first steering device is a front steering device of the vehicle for controlling steering at a front wheel of the vehicle.

9. The system of claim 8, wherein the second steering device is at least one of: (i) a rear steering device for controlling steering at a rear wheel of the vehicle; (ii) a torque vector device for controlling steering of the vehicle; and (iii) an individual braking system for controlling steering of the vehicle.

10. The system of claim 7, wherein the processor is further configured to operate the lateral control module to generate the first steering command using model predictive control using a steering request and the state of the vehicle.

11. The system of claim 10, wherein the processor is further configured to operate the compensation module to generate the adjusted value to the second steering command and send the adjusted value to the second steering command to the second steering device.

12. The system of claim 7, wherein the processor is further configured to operate the estimation module to estimate the external lateral force using at least one of: (i) a filter; (ii) an Extended Kalman Filter; and (iii) a neural network.

13. A vehicle, comprising:
   a front wheel;
   a first steering device for generating a first steering force at the front wheel;
   a second steering device for generating a second steering force at the vehicle;
   a processor configured to:
      operate a lateral control module to send a first steering command to the first steering device;
      operate an estimation module to estimate an external lateral force applied to the vehicle based on the first steering command, a second steering command, and a state of the vehicle, wherein the second steering command is applied to the second steering device, and to determine a lateral deviation of the vehicle with respect to a nominal lateral deviation due to the external lateral force;

operate a compensation module to determine a second steering reference and send the second steering reference to the lateral control module;

operate the lateral control module to apply model predictive control to the second steering reference to generate an adjusted value to the second steering command from the second steering reference and send the adjusted value to the second steering command to the second steering device; and operate the second steering device of the vehicle based on the adjusted value to the second steering command to generate the second steering force at the vehicle that attenuates the external lateral force to maintain the vehicle at the nominal lateral deviation.

14. The vehicle of claim 13, wherein the second steering device is at least one of: (i) a rear steering device for controlling steering at a rear wheel of the vehicle; (ii) a torque vector device for controlling steering of the vehicle; and (iii) an individual braking system for controlling steering of the vehicle.

15. The vehicle of claim 13, wherein the processor is further configured to operate the lateral control module to generate the first steering command using model predictive control using a steering request and the state of the vehicle.

16. The vehicle of claim 15, wherein the processor is further configured to operate the compensation module to generate the adjusted value of the second steering command and send the adjusted value of the second steering command to the second steering device.

17. The vehicle of claim 13, wherein the processor is further configured to operate the estimation module to estimate the external lateral force using at least one of: (i) a filter; (ii) an Extended Kalman Filter; and (iii) a neural network.

18. The method of claim 1, wherein applying model predictive control to the second steering reference further comprises applying a bicycle model to the second steering reference.

19. The system of claim 7, wherein applying model predictive control to the second steering reference further comprises applying a bicycle model to the second steering reference.

20. The vehicle of claim 13, wherein applying model predictive control to the second steering reference further comprises applying a bicycle model to the second steering reference.

* * * * *